United States Patent
Wang et al.

(10) Patent No.: US 11,791,891 B2
(45) Date of Patent: Oct. 17, 2023

(54) COMMUNICATION METHOD AND COMMUNICATION APPARATUS

(71) Applicant: HUAWEI TECHNOLOGIES CO., LTD., Guangdong (CN)

(72) Inventors: Yu Wang, Hangzhou (CN); Yunfei Qiao, Hangzhou (CN); Hejia Luo, Hangzhou (CN); Xian Meng, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 36 days.

(21) Appl. No.: 17/684,730

(22) Filed: Mar. 2, 2022

(65) Prior Publication Data
US 2022/0190910 A1    Jun. 16, 2022

Related U.S. Application Data

(63) Continuation of application No. PCT/CN2020/109827, filed on Aug. 18, 2020.

(30) Foreign Application Priority Data

Sep. 5, 2019 (CN) .......................... 201910836946.4

(51) Int. Cl.
*H04B 7/185* (2006.01)
*H04B 15/00* (2006.01)

(52) U.S. Cl.
CPC ..... *H04B 7/18513* (2013.01); *H04B 7/18558* (2013.01); *H04B 15/00* (2013.01)

(58) Field of Classification Search
CPC ............ H04B 7/18513; H04B 7/18558; H04B 15/00; H04B 7/18521
See application file for complete search history.

(56) References Cited

U.S. PATENT DOCUMENTS

| 6,157,811 A | 12/2000 | Dent |
| 2016/0337028 A1 | 11/2016 | Jalali et al. |
| 2018/0219614 A1* | 8/2018 | Morris ................... H04B 7/12 |

FOREIGN PATENT DOCUMENTS

| CN | 102711114 A | 10/2012 |
| CN | 103796319 A | 5/2014 |

(Continued)

OTHER PUBLICATIONS

Jia et al., "Interbeam Interference Constrained Resource Allocation for Shared Spectrum Multibeam Satellite Communication Systems," IEEE Internet of Things Journal, vol. 6, No. 4, Aug. 2019, 8 pages.

(Continued)

*Primary Examiner* — Keith Ferguson
(74) *Attorney, Agent, or Firm* — Fish & Richardson P.C.

(57) ABSTRACT

Example communication methods and communication apparatus are described. One example method includes sending a first message by a first satellite to a second satellite. The first message includes information about a frequency reuse scheme. The information about the frequency reuse scheme includes basic unit information. The basic unit information includes central point locations and frequency information of at least N−1 beams. Herein, N is a frequency reuse factor of the first satellite. At least N−1 different pieces of frequency information exist in the frequency information that is of the at least N−1 beams and that is included in the basic unit information. In addition, N is a positive integer greater than or equal to 3.

11 Claims, 10 Drawing Sheets

(56) References Cited

FOREIGN PATENT DOCUMENTS

| | | | |
|---|---|---|---|
| CN | 105959073 | A | 9/2016 |
| CN | 106471836 | A | 3/2017 |
| CN | 107251452 | A | 10/2017 |
| CN | 108882245 | A | 11/2018 |
| WO | 2013036328 | A1 | 3/2013 |

OTHER PUBLICATIONS

Huawei et al., "Discussion on Performance Evaluation for NTN," 3GPP TSG RAN WG1 Meeting #98, R1-1908047, Prague, Czech Republic, Aug. 26-30, 2019, 52 pages.

Extended European Search Report in European Appln No. 20860085.8, dated Sep. 26, 2022, 10 pages.

Karahan et al., "A frequency Selective Surface Design to Reduce the Interference Effect on Satellite Communication," 8th International Conference on Recent Advances in Space Technologies (RAST), Jun. 2017, 3 pages.

Office Action issued in Chinese Application No. 201910836946.4 dated Dec. 3, 2021, 12 pages (with English translation).

PCT International Search Report and Written Opinion issued in International Application No. PCT/CN2020/109827 dated Nov. 20, 2020, 13 pages (with English translation).

\* cited by examiner

COMMUNICATION METHOD AND COMMUNICATION APPARATUS

CROSS-REFERENCE TO RELATED APPLICATIONS

This application is a continuation of International Application No. PCT/CN2020/109827, filed on Aug. 18, 2020, which claims priority to Chinese Patent Application No. 201910836946.4, filed on Sep. 5, 2019. The disclosures of the aforementioned applications are hereby incorporated by reference in their entireties.

TECHNICAL FIELD

Embodiments of this application relate to the field of communication technologies, and in particular, to a communication method and a communication apparatus.

BACKGROUND

Satellite communication has apparent advantages of global coverage, long-distance transmission, flexible networking, convenient deployment, and not limited by geographical conditions; and therefore, is widely applied to a plurality of fields such as maritime communication, positioning and navigation, disaster relief, scientific experiments, video broadcasting, and earth observation.

In the satellite communication, a multi-color frequency reuse manner is generally used for communication. FIG. 1a shows a four-color frequency reuse method in which a system bandwidth is equally divided into four frequency bands. Center frequencies of the frequency bands are respectively f1, f2, f3, and f4. Communication is implemented at different frequencies for adjacent beams of a satellite, to suppress inter-beam interference. When satellites move to a high-latitude (distant from the equator) region, an overlapping part between coverage regions of the satellites increases. In this case, inter-beam interference is increased, which does not facilitate communication with a terminal. The inter-beam interference between the satellites can be reduced through closing some edge beams of the satellites. As shown in FIG. 1b, an overlapping coverage region exists between a satellite 2 and each of a satellite 1 and a satellite 3. Beams at outer edges of the satellite 2 may be closed to suppress interference. However, in the manner of closing an edge beam of a satellite, a distance between the satellite 2 and each of beams used for communication at the frequency f2 of the satellite 1 and the satellite 3 becomes smaller, which still causes an increase of the inter-beam interference. Therefore, interference cannot be well avoided in the manner of closing an edge beam of a satellite.

SUMMARY

Embodiments of this application provide a communication method and a communication apparatus, to resolve a problem of a poor interference suppression effect caused by closing an edge beam of a satellite.

According to a first aspect, a communication method is provided. The method may be performed by a first satellite. The first satellite may send a first message to a second satellite. The first message may include information about a frequency reuse scheme of the first satellite. A frequency reuse factor of the frequency reuse scheme of the first satellite is N. In other words, the first satellite performs communication in an N-color frequency reuse manner. Herein, N is a positive integer greater than or equal to 3. The information about the frequency reuse scheme includes basic unit information. The basic unit information includes central point locations and frequency information of at least N−1 beams. The at least N−1 central point locations included in the basic unit information are different from one another. At least N−1 different pieces of frequency information exist in the at least N−1 pieces of frequency information included in the basic unit information. For example, N−1 different pieces of frequency information exist, or N different pieces of frequency information exist.

For example, N is 4, and four frequencies are respectively f1, f2, f3, and f4. The basic unit information includes five pieces of frequency information. Three different pieces of frequency information may exist in the five pieces of frequency information. For example, if the five pieces of frequency information are respectively f1, f1, f2, f2, and f3, the three different pieces of frequency information: respectively f1, f2, and f3 exist. Alternatively, four different pieces of frequency information may exist in the five pieces of frequency information. For example, if the five pieces of frequency information are respectively f1, f1, f2, f3, and f4, four different pieces of frequency information: respectively f1, f2, f3, and f4 exist.

The first satellite sends the basic unit information of the frequency reuse scheme of the first satellite to the second satellite, so that the second satellite adjusts a frequency reuse scheme of the second satellite based on the basic unit information sent by the first satellite. A satellite performs communication by using a dynamic frequency reuse scheme, to better avoid inter-beam interference.

In a possible implementation, the information that is about the frequency reuse scheme and that is sent by the first satellite to the second satellite may include a first information element used to carry the frequency information that is of the at least N−1 beams and that is included in the basic unit information and a second information element used to carry the central point locations that are of the at least N−1 beams and that are included in the basic unit information.

A new message format is designed, to implement transmission of the basic unit information of the frequency reuse scheme, thereby avoiding inter-beam interference.

In a possible implementation, before the first satellite sends the first message to the second satellite, the first satellite may first update, based on a communication interference status of the first satellite and/or ephemeris information of the first satellite, the frequency reuse scheme used by the first satellite, and then send the basic unit information of the updated frequency reuse scheme to the second satellite.

The first satellite may first dynamically adjust the frequency reuse scheme of the first satellite, and then send the updated frequency reuse scheme to the second satellite, so that the second satellite adjusts the frequency reuse scheme of the second satellite. A satellite performs communication by using a dynamic frequency reuse scheme, to better avoid inter-beam interference.

In a possible implementation, the first satellite and the second satellite are in the same satellite cluster. The first satellite is a cluster head satellite. The cluster head satellite does not update the frequency reuse scheme of the cluster head satellite; or when updating the frequency reuse scheme of the cluster head satellite, the cluster head satellite does not refer to a frequency reuse scheme of a cluster member satellite, where the second satellite is the cluster member satellite. A plurality of satellites at adjacent locations together form the satellite cluster. The first satellite is the cluster head satellite in the satellite cluster, and the second satellite is the cluster member satellite in the satellite cluster. The cluster head satellite may send the basic unit information of the frequency reuse scheme of the cluster head satellite to any cluster member satellite, so that the cluster member satellite dynamically adjusts a frequency reuse scheme of the cluster member satellite based on the frequency reuse scheme of the cluster head satellite, to better avoid inter-beam interference.

According to a second aspect, a communication method is provided. The method may be performed by a second satellite. The second satellite may receive a first message sent by a first satellite. The first message may include information about a frequency reuse scheme of the first satellite. A frequency reuse factor of the frequency reuse scheme of the first satellite is N. In other words, the first satellite performs communication in an N-color frequency reuse manner. Herein, N is a positive integer greater than or equal to 3. The information about the frequency reuse scheme includes basic unit information. The basic unit information includes central point locations and frequency information of at least N−1 beams. The at least N−1 central point locations included in the basic unit information are different from one another. At least N−1 different pieces of frequency information exist in the at least N−1 pieces of frequency information included in the basic unit information. For example, N−1 different pieces of frequency information exist, or N different pieces of frequency information exist. The second satellite may further update a frequency reuse scheme of the second satellite based on the basic unit information of the frequency reuse scheme of the first satellite.

For example, N is 4, and four frequencies are respectively f1, f2, f3, and f4. The basic unit information includes five pieces of frequency information. Three different pieces of frequency information may exist in the five pieces of frequency information. For example, if the five pieces of frequency information are respectively f1, f1, f2, f2, and f3, the three different pieces of frequency information: respectively f1, f2, and f3 exist. Alternatively, four different pieces of frequency information may exist in the five pieces of frequency information. For example, if the five pieces of frequency information are respectively f1, f1, f2, f3, and f4, four different pieces of frequency information: respectively f1, f2, f3, and f4 exist.

The first satellite sends the basic unit information of the frequency reuse scheme of the first satellite to the second satellite, so that the second satellite can adjust the frequency reuse scheme of the second satellite based on the basic unit information sent by the first satellite. A satellite performs communication by using a dynamic frequency reuse scheme, to better avoid inter-beam interference.

In a possible implementation, the information that is about the frequency reuse scheme and that is sent by the first satellite to the second satellite may include a first information element used to carry the frequency information that is of the at least N−1 beams and that is included in the basic unit information and a second information element used to carry the central point locations that are of the at least N−1 beams and that are included in the basic unit information.

A new message format is designed, to implement transmission of the basic unit information of the frequency reuse scheme, thereby avoiding inter-beam interference.

In a possible implementation, the first satellite and the second satellite are in the same satellite cluster. The first satellite is a cluster head satellite. It is allowed that, the cluster head satellite does not update the frequency reuse scheme of the cluster head satellite; or when updating the frequency reuse scheme of the cluster head satellite, the cluster head satellite does not refer to a frequency reuse scheme of a cluster member satellite.

A plurality of satellites at adjacent locations together form the satellite cluster. The first satellite is the cluster head satellite in the satellite cluster, and the second satellite is a cluster member satellite in the satellite cluster. The cluster head satellite may send the basic unit information of the frequency reuse scheme of the cluster head satellite to any cluster member satellite, so that the cluster member satellite dynamically adjusts the frequency reuse scheme of the cluster member satellite based on the frequency reuse scheme of the cluster head satellite, to better avoid inter-beam interference.

According to a third aspect, a communication apparatus is provided. The communication apparatus has a function of implementing the first satellite in the foregoing method embodiment. The function may be implemented by hardware, or may be implemented by hardware by executing corresponding software. The hardware or the software includes one or more function modules corresponding to the foregoing function.

According to a fourth aspect, a communication apparatus is provided. The communication apparatus has a function of implementing the second satellite in the foregoing method embodiment. The function may be implemented by hardware, or may be implemented by hardware by executing corresponding software. The hardware or the software includes one or more function modules corresponding to the foregoing function.

According to a fifth aspect, a communication apparatus is provided. The communication apparatus may be the first satellite or a chip disposed in the first satellite in the foregoing method embodiment. The communication apparatus includes a transceiver and a processor, and optionally, the communication apparatus further includes a memory. The memory is configured to store a computer program or instructions. The processor is separately coupled to the memory and the transceiver. When the processor executes the computer program or the instructions, the communication apparatus is enabled to perform the method performed by the first satellite in the foregoing method embodiment.

According to a sixth aspect, a communication apparatus is provided. The communication apparatus may be the second satellite or a chip disposed in the second satellite in the foregoing method embodiment. The communication apparatus includes a transceiver and a processor, and optionally, the communication apparatus further includes a memory. The memory is configured to store a computer program or instructions. The processor is separately coupled to the memory and the transceiver. When the processor executes the computer program or the instructions, the communication apparatus is enabled to perform the method performed by the second satellite in the foregoing method embodiment.

According to a seventh aspect, a computer program product is provided. The computer program product includes computer program code. When the computer program code is run on a computer, the computer is enabled to perform the method performed by the first satellite in the first aspect and any one of the possible implementations of the first aspect.

According to an eighth aspect, a computer program product is provided. The computer program product includes computer program code. When the computer program code is run on a computer, the computer is enabled to perform the method performed by the second satellite in the second aspect and any one of the possible implementations of the second aspect.

According to a ninth aspect, this application provides a chip system. The chip system includes a processor and a memory. The processor is electrically coupled to the memory. The memory is configured to store computer program instructions. The processor is configured to execute some or all of the computer program instructions in the memory. When the some or all of the computer program instructions are executed, the processor is configured to implement functions of the first satellite in the method in the first aspect and any one of the possible implementations of the first aspect.

In a possible design, the chip system further includes a transceiver. The transceiver is configured to: send a signal processed by the processor, or receive a signal and input the signal to the processor. The chip system may include a chip, or may include a chip and another discrete component.

According to a tenth aspect, a chip system is provided. The chip system includes a processor and a memory. The processor is electrically coupled to the memory. The memory is configured to store computer program instructions. The processor is configured to execute some or all of the computer program instructions in the memory. When the some or all of the computer program instructions are executed, the processor is configured to implement functions of the second satellite in the method in the second aspect and any one of the possible implementations of the second aspect.

In a possible design, the chip system further includes a transceiver. The transceiver is configured to: send a signal processed by the processor, or receive a signal and input the signal to the processor. The chip system may include a chip, or may include a chip and another discrete component.

According to an eleventh aspect, a computer-readable storage medium is provided. The computer-readable storage medium stores a computer program. When the computer program is run, the method performed by the first satellite in the first aspect and any one of the possible implementations of the first aspect is implemented.

According to a twelfth aspect, this application provides a computer-readable storage medium. The computer-readable storage medium stores a computer program. When the computer program is run, the method performed by the second satellite in the second aspect and any one of the possible implementations of the second aspect is implemented.

According to a thirteenth aspect, a communication system is provided. The system may include the first satellite in the method in the first aspect and any one of the possible implementations of the first aspect, and the second satellite in the method in the second aspect and any one of the possible implementations of the second aspect.

In a possible implementation, the first satellite may be configured to send a first message to the second satellite, and correspondingly, the second satellite may be configured to receive the first message sent by the first satellite. The first message includes information about a frequency reuse scheme. The information about the frequency reuse scheme includes basic unit information. The basic unit information includes central point locations and frequency information of at least N−1 beams. Herein, N is a frequency reuse factor of the first satellite. At least N−1 different pieces of frequency information exist in the at least N−1 pieces of frequency information included in the basic unit information. For example, N−1 or N different pieces of frequency information exist. In addition, N is a positive integer greater than or equal to 3. The second satellite may be further configured to update a frequency reuse scheme of the second satellite based on the basic unit information of the frequency reuse scheme.

The first satellite sends the basic unit information of the frequency reuse scheme of the first satellite to the second satellite, so that the second satellite can adjust the frequency reuse scheme of the second satellite based on the basic unit information sent by the first satellite. A satellite performs communication by using a dynamic frequency reuse scheme, to better avoid inter-beam interference.

In a possible implementation, the information that is about the frequency reuse scheme and that is sent by the first satellite to the second satellite may include a first information element used to carry the frequency information that is of the at least N−1 beams and that is included in the basic unit information and a second information element used to carry the central point locations that are of the at least N−1 beams and that are included in the basic unit information.

A new message format is designed, to implement transmission of the basic unit information of the frequency reuse scheme, thereby avoiding inter-beam interference.

In a possible implementation, the first satellite and the second satellite are in the same satellite cluster. The first satellite is a cluster head satellite. It is allowed that, the cluster head satellite does not update the frequency reuse scheme of the cluster head satellite; or when updating the frequency reuse scheme of the cluster head satellite, the cluster head satellite does not refer to a frequency reuse scheme of a cluster member satellite.

A plurality of satellites at adjacent locations together form the satellite cluster. The first satellite is the cluster head satellite in the satellite cluster, and the second satellite is a cluster member satellite in the satellite cluster. The cluster head satellite may send the basic unit information of the frequency reuse scheme of the cluster head satellite to any cluster member satellite, so that the cluster member satellite dynamically adjusts the frequency reuse scheme of the cluster member satellite based on the frequency reuse scheme of the cluster head satellite, to better avoid inter-beam interference.

In a possible implementation, before sending the first message to the second satellite, the first satellite may be further configured to: update, based on a communication interference status of the first satellite and/or ephemeris information of the first satellite, the frequency reuse scheme used by the first satellite; and then, send the basic unit information of the updated frequency reuse scheme to the second satellite.

The first satellite may first dynamically adjust the frequency reuse scheme of the first satellite, and then send the updated frequency reuse scheme to the second satellite, so that the second satellite adjusts the frequency reuse scheme of the second satellite. A satellite performs communication by using a dynamic frequency reuse scheme, to better avoid inter-beam interference.

DESCRIPTION OF EMBODIMENTS

Figure 1A:
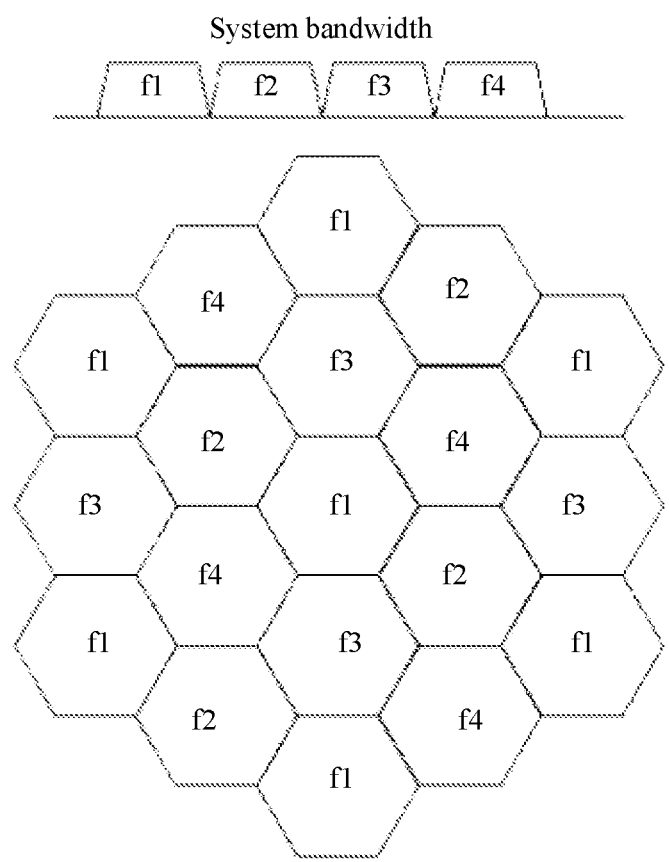
FIG. 1a shows a four-color frequency reuse method according to an embodiment of this application.

The following describes in detail the embodiments of this application with reference to the accompanying drawings.

To facilitate the readers to understand the embodiments of this application, some terms used in the embodiments of this application are first explained and described. It may be understood that the following terms are used to help the readers better understand application scenarios and technical solutions of this application, so that the readers can quickly understand technical features in the solutions based on explanations of the terms. The explanations of the terms do not constitute limitation on the technical features.

(1) A terminal is also referred to as user equipment (user equipment, UE), a mobile station (mobile station, MS), a mobile terminal (mobile terminal, MT), or the like, and is a device that provides voice and/or data connectivity for a user. For example, the terminal device includes a handheld device, an in-vehicle device, an Internet of thing device, or the like having a wireless connection function. Currently, the terminal device may be a mobile phone (mobile phone), a tablet computer, a notebook computer, a palmtop computer, a mobile Internet device (mobile Internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in a remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or the like.

(2) A network device is a device communicating with the terminal device. The network device may be a base station, or may be an evolved NodeB (evolved NodeB, eNB, or eNodeB) in an LTE system, or may be a radio controller in a cloud radio access network (cloud radio access network, CRAN) scenario. Alternatively, the network device may be a relay node, an access point, a vehicle-mounted device, a next generation NodeB (next generation Node B, gNodeB) in a 5G network, or the like. This is not limited in the embodiments of this application.

(3) A core network device includes but is not limited to an access and mobility management function (access and mobility management function, AMF) network element. The AMF has a control plane function in a core network, and provides mobility management and access management functions for a user.

(4) A beam is a shape of electromagnetic waves emitted by a satellite antenna on a surface of the earth. This is like a specific range of a light beam of a flashlight. Alternatively, a satellite does not transmit signals at 360°, but transmit signal waves in a specific direction.

(5) A satellite cluster: The satellite cluster is formed by combining a plurality of satellites at adjacent locations.

(6) A cluster head satellite is a decision satellite that is responsible for updating a frequency reuse scheme in the satellite cluster. In other words, when the cluster head satellite determines that a frequency reuse scheme needs to be updated, the cluster head satellite may not update the frequency reuse scheme, and a cluster member satellite updates the frequency reuse scheme. Alternatively, the cluster head satellite does not need to consider a frequency reuse scheme of a cluster member satellite when updating a frequency reuse scheme of the cluster head satellite, and the cluster member satellite needs to update the frequency reuse scheme based on the frequency reuse scheme of the cluster head satellite when updating the frequency reuse scheme of the cluster member satellite.

(7) Ephemeris information: Ephemeris is a time function for indicating a precise location or track table of a celestial body running with time during GPS measurement. Satellite ephemeris can be used to determine an operating status of a flying body such as a time, a location, and a speed.

The term "and/or" in this application describes an association relationship for describing associated objects and indicates that three relationships may exist. For example, A and/or B may indicate the following three cases: Only A exists, both A and B exist, and only B exists. The character "/" usually indicates an "or" relationship between the associated objects.

"A plurality of" in this application means two or more.

In the descriptions of this application, terms such as "first" and "second" are merely used for distinction and description, and should not be understood as an indication or implication of relative importance, or as an indication or implication of a sequence.

In addition, the term "example" in the embodiments of this application is used to indicate giving an example, an illustration, or a description. Any embodiment or implementation solution described as an "example" in this application should not be explained as being more preferred or having more advantages than another embodiment or implementation solution. Exactly, the term "example" is used to present a concept in a specific manner.

The embodiments of this application provide a communication method and a communication apparatus. The method and the apparatus are based on the same technical concept. Principles by which the method and the apparatus resolve a problem are similar. Therefore, embodiments of the apparatus and the method may be cross-referenced. A repeated part is not described again.

The technical solutions of the embodiments of this application may be applied to various communication systems, for example, a satellite communication system. The satellite communication system may be integrated with a conventional mobile communication system. For example, the mobile communication system may be a 4th generation (4th generation, 4G) communication system (for example, a long term evolution (long term evolution, LTE) system), a worldwide interoperability for microwave access (worldwide interoperability for microwave access, WiMAX) communication system, a 5th generation (5th generation, 5G) communication system (for example, a new radio (new radio, NR) system), and a future mobile communication system.

Figure 2:
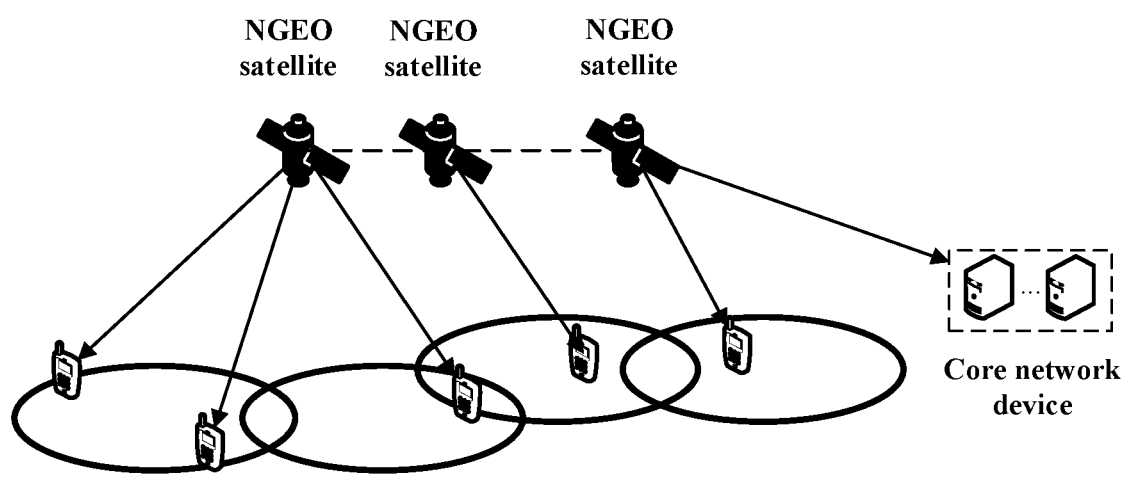
FIG. 2 is a schematic architectural diagram of a mobile satellite communication system according to an embodiment of this application.

For example, FIG. 2 is a schematic architectural diagram of a possible mobile satellite communication system to which this application is applicable. If the satellite communication system is compared with a ground communication system, a satellite may be considered as one or more network devices such as a base station on the ground. The satellite provides a communication service to a mobile terminal. The satellite may further be connected to a core network device (for example, an AMF). In this scenario, the satellite may be a non-geostationary earth orbit (non-geostationary earth orbit, NGEO) satellite.

For ease of understanding of the embodiments of this application, application scenarios of this application are described in the following. Service scenarios described in the embodiments of this application are used to more clearly describe the technical solutions in the embodiments of this application, but are not intended to limit the technical solutions provided in the embodiments of this application. Persons of ordinary skill in the art may learn that, as a new service scenario emerges, the technical solutions provided in the embodiments of this application are also applicable to similar technical problems.

Figure 1B:
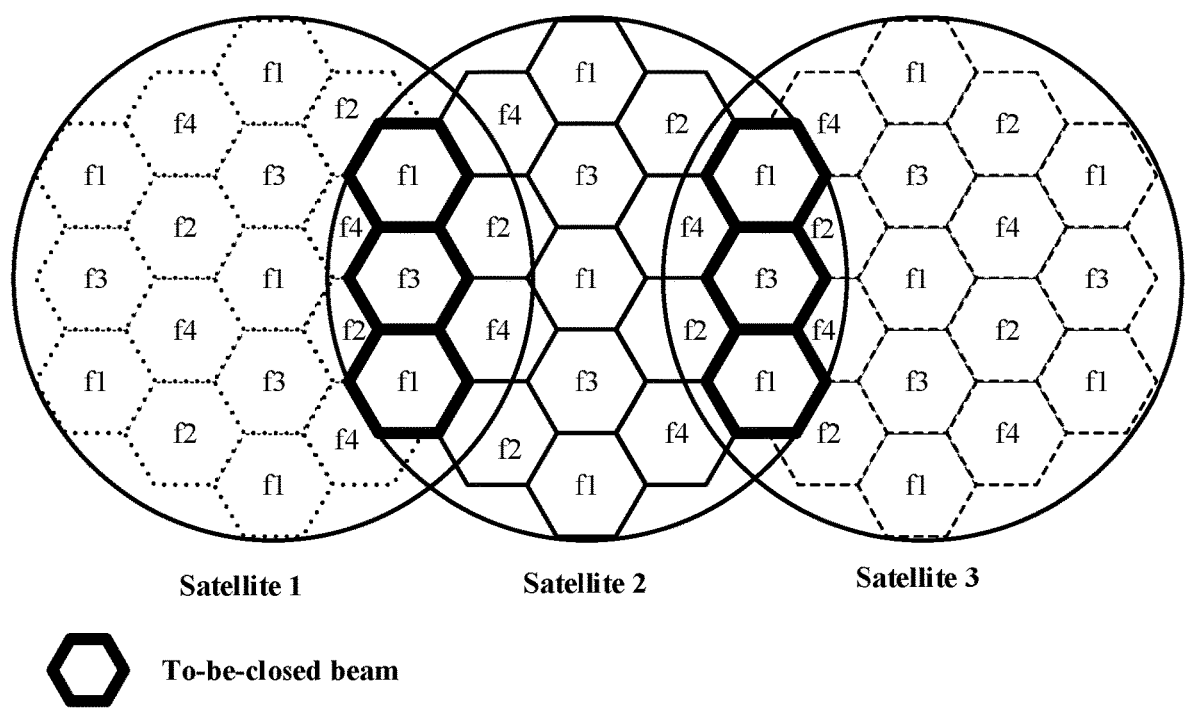
FIG. 1b shows a multi-satellite frequency reuse method according to an embodiment of this application.
Figure 1C:
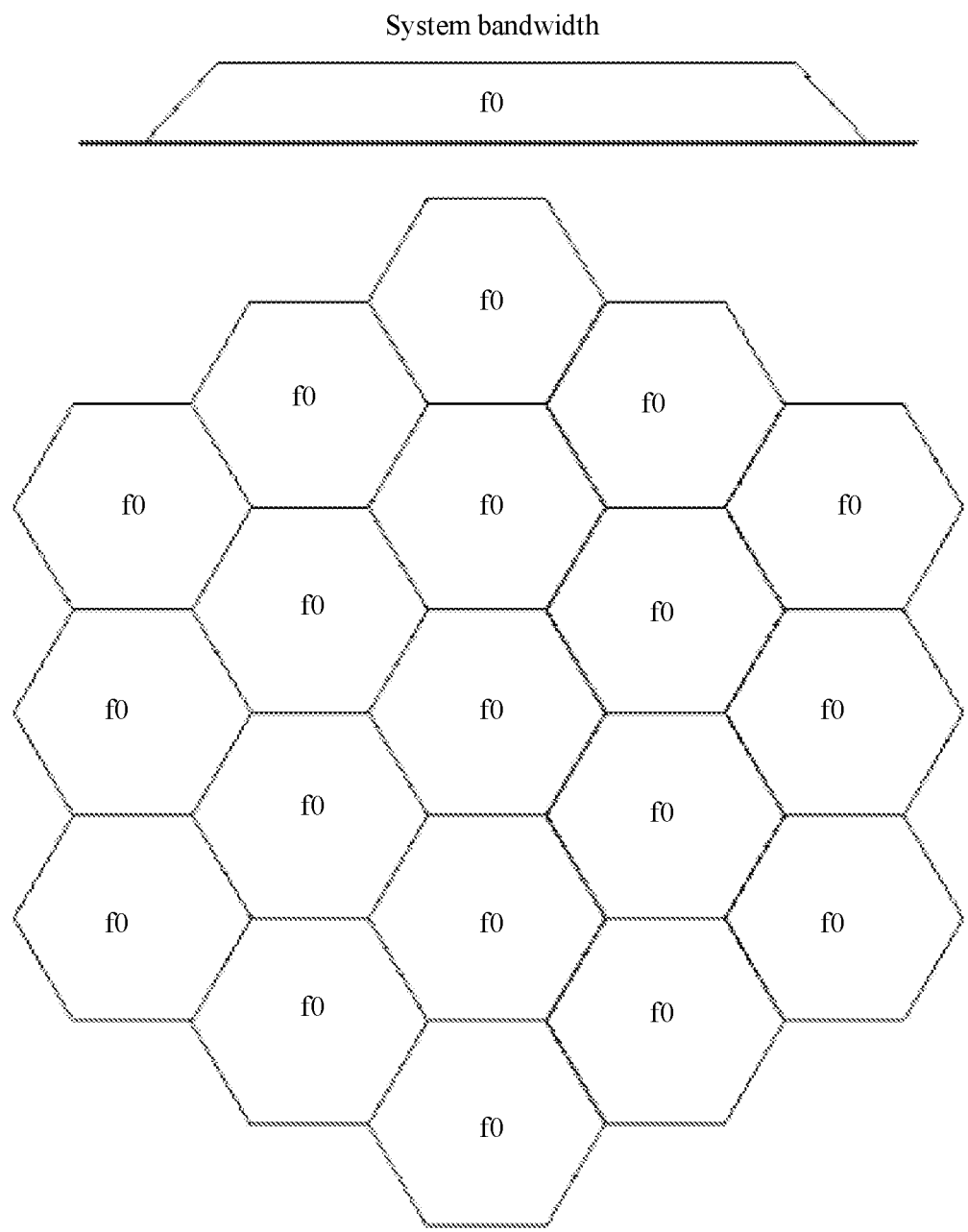
FIG. 1c shows a full-frequency reuse method according to an embodiment of this application.

As shown in FIG. 1c, in a terrestrial cellular network, a base station generally communicates with a terminal in a full-frequency reuse manner. In other words, all cells of the base station reuse the same frequency band to communicate with the terminal. For example, a system bandwidth is divided into one frequency band. A center frequency of the frequency band is f0. All the cells communicate with the terminal by using the frequency band whose center frequency is f0. In a satellite communication network, one satellite includes a plurality of beams. Each beam may be considered as one cell or one base station. Signal strength at a central point location of the satellite beam is not much different from signal strength at an edge location. If communication is performed in the full-frequency reuse manner as the base station in the terrestrial communication network, interference may occur between adjacent beams. Therefore, in the satellite communication system, inter-beam interference between satellites is usually reduced in a multi-color frequency reuse manner. As shown in FIG. 1a, a four-color frequency reuse method is provided. In other words, a system bandwidth is equally divided into four frequency bands. Center frequencies of the frequency bands are respectively f1, f2, f3, and f4. Communication is implemented with the terminal at different frequencies for adjacent beams of a satellite, to achieve an interference suppression effect.

A static frequency reuse scheme is usually used in an existing satellite communication network. A frequency of each satellite beam does not change. When satellites move to a high-latitude (distant from the equator) region, an overlapping part between coverage regions of the satellites increases. In this case, inter-beam interference between the satellites can be reduced through closing some edge beams of the satellites. As shown in FIG. 1b, an overlapping coverage region exists between a satellite 2 and each of a satellite 1 and a satellite 3. Beams at outer edges of the satellite 2 (six beams corresponding to gray hexagons in the figure) may be closed to reduce interference between the satellites.

The operation of closing the beam is simple. Although the interference between the satellites can be reduced to some extent, the interference still exists. For example, in FIG. 1b, a distance between the satellite 2 and each of beams for communication at the frequency f2 of the satellite 1 and the satellite 3 becomes smaller. In this case, the interference still exists. Therefore, to achieve optimal interference management, this application proposes a satellite dynamic frequency reuse scheme in which a satellite dynamically adjusts a frequency of a beam of the satellite.

Figure 3:
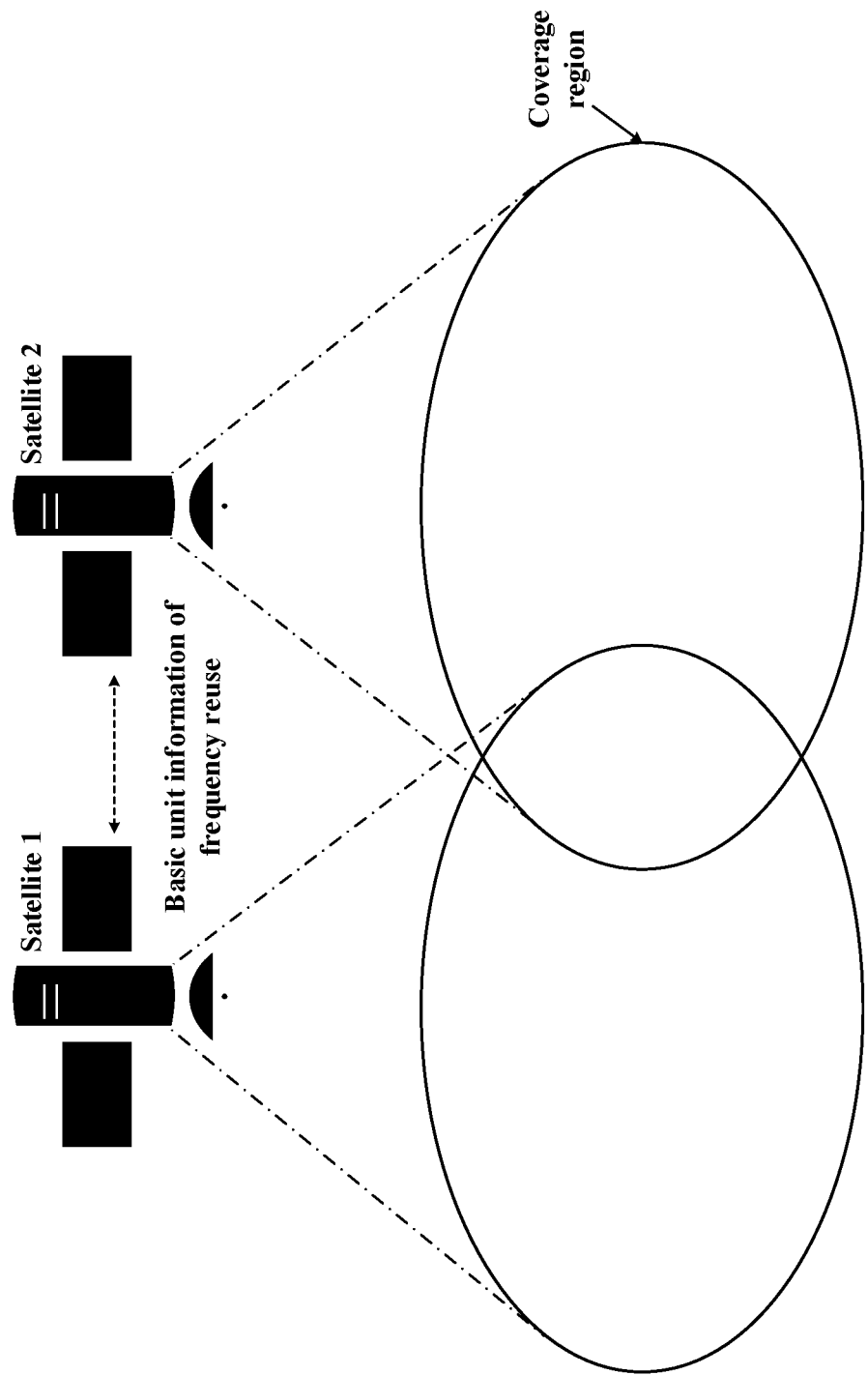
FIG. 3 is a schematic diagram of a dynamic frequency reuse scheme according to an embodiment of this application.

As shown in FIG. 3, two adjacent satellites are respectively a satellite 1 and a satellite 2, and an overlapping part exists between a coverage region of the satellite 1 and a coverage region of the satellite 2. The satellite 1 may notify the satellite 2 of a frequency reuse scheme used by the satellite 1. The satellite 2 adjusts a frequency reuse scheme of the satellite 2 based on the frequency reuse scheme used by the satellite 1, to avoid inter-beam interference between the satellite 1 and the satellite 2. When the satellite 1 notifies the satellite 2 of the frequency reuse scheme used by the satellite 1, the satellite 1 may send basic unit information of the frequency reuse scheme used by the satellite 1 to the satellite 2. The satellite 1 performs communication in an N-color frequency reuse manner. Herein, N is a frequency reuse factor of the satellite 1, and N is a positive integer greater than or equal to 3. For example, $N=i2+j2+i*j$, where i is an integer greater than or equal to 0, and j is an integer greater than or equal to 0. The basic unit information includes central point locations and frequency information of at least N−1 beams. At least N−1 different pieces of frequency information exist in the at least N−1 pieces of frequency information included in the basic unit information. For example, when the basic unit information includes the frequency information of the N−1 beams, the pieces of frequency information of the N−1 beams are different. When the basic unit information includes frequency information of at least N beams, N−1 or N different pieces of frequency information may exist in the at least N pieces of frequency information.

For example, N is 4, and four frequencies are respectively f1, f2, f3, and f4. The basic unit information may include five pieces of frequency information. Three different pieces of frequency information may exist in the five pieces of frequency information. For example, if the five pieces of frequency information are respectively f1, f1, f2, f2, and f3, the three different pieces of frequency information: respectively f1, f2, and f3 exist. Alternatively, four different pieces of frequency information may exist in the five pieces of frequency information. For example, if the five pieces of frequency information are respectively f1, f1, f2, f3, and f4, four different pieces of frequency information: respectively f1, f2, f3, and f4 exist.

Alternatively, the basic unit information includes three pieces of frequency information. Three different pieces of frequency information may exist in the three pieces of frequency information. For example, the three pieces of frequency information are respectively f1, f2, and f3. Alternatively, the basic unit information may include four pieces of frequency information. For example, the four pieces of frequency information are respectively f1, f1, f2, and f3. Three different pieces of frequency information may exist in the four pieces of frequency information. For example, the three pieces of frequency information are respectively f1, f2, and f3. Alternatively, the basic unit information may include four pieces of frequency information. For example, the four pieces of frequency information are respectively f1, f2, f3, and f4. Four different pieces of frequency information: respectively f1, f2, f3, and f4 may exist in the four pieces of frequency information.

Figure 4:
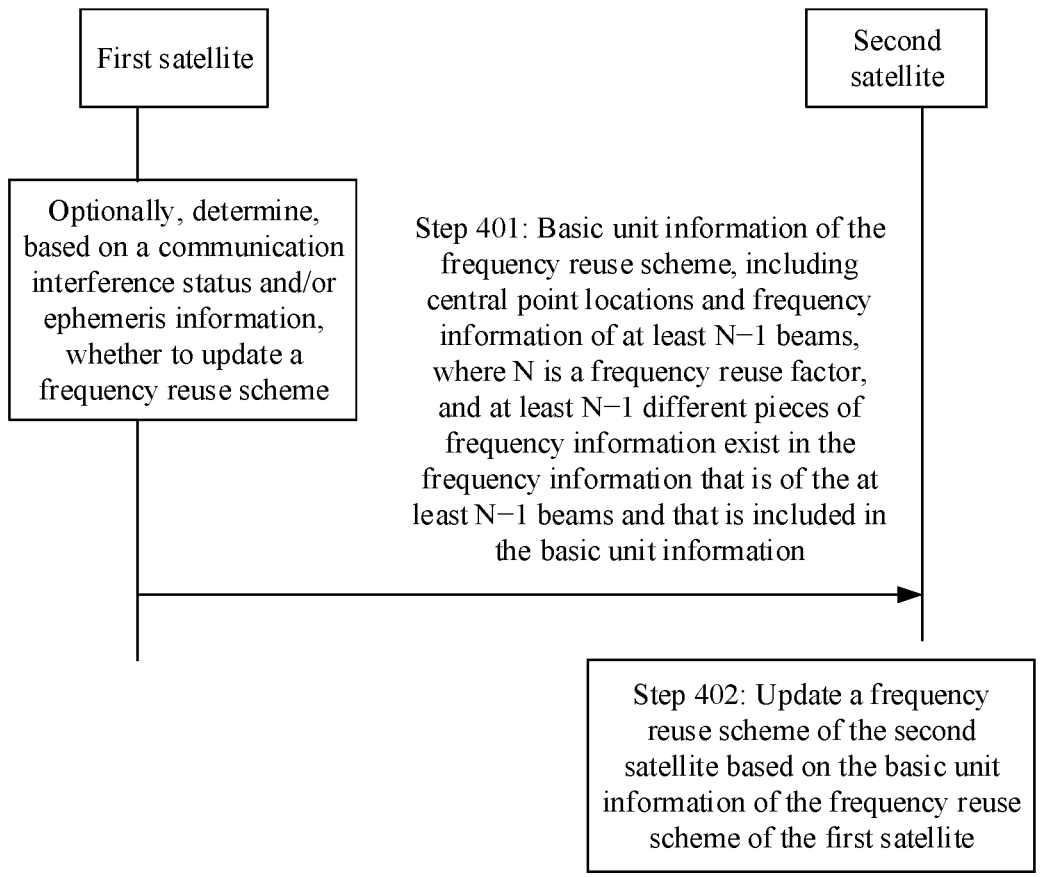
FIG. 4 is a flowchart of a dynamic frequency reuse scheme according to an embodiment of this application.

As shown in FIG. 4, a communication method is provided. A procedure about a dynamic frequency reuse scheme of a satellite is described in detail. A first satellite in FIG. 4 may be the satellite 1 in FIG. 3, and a second satellite in FIG. 4 may be the satellite 2 in FIG. 3. In a possible implementation, the first satellite and the second satellite in FIG. 4 may be relatively close to each other but have no overlapping coverage region.

Step 401: The first satellite sends a first message to the second satellite, and correspondingly, the second satellite receives the first message sent by the first satellite. The first message includes information about a frequency reuse scheme of the first satellite. The information about the frequency reuse scheme includes basic unit information.

The first message may be referred to as a frequency pattern status (frequency pattern status) message.

It is assumed that a frequency reuse factor of the first satellite is N. For the basic unit information in the first message, refer to the basic unit information of the frequency reuse scheme of the satellite 1. A repeated part is not described again.

Step 402: The second satellite updates a frequency reuse scheme of the second satellite based on the basic unit information of the frequency reuse scheme of the first satellite.

The first satellite sends the basic unit information of the frequency reuse scheme of the first satellite to the second satellite, so that the second satellite can deduce the frequency reuse scheme of the first satellite based on the basic unit information sent by the first satellite, and then adjust the frequency reuse scheme of the second satellite based on the frequency reuse scheme of the first satellite. A satellite performs communication by using a dynamic frequency reuse scheme, to better avoid inter-beam interference.

In an example, as shown in FIG. 4, the first satellite may first determine whether to update the frequency reuse scheme used by the first satellite. If the frequency reuse scheme used by the first satellite is updated, the first satellite first updates the frequency reuse scheme, and then sends the basic unit information of the updated frequency reuse scheme to the second satellite. If the frequency reuse scheme is not updated, the first satellite sends the basic unit information of the currently used frequency reuse scheme to the second satellite.

Specifically, the first satellite may determine, based on a communication interference status of the first satellite and/or ephemeris information of the first satellite, whether to update the frequency reuse scheme used by the first satellite.

The first satellite may periodically detect the communication interference status. For example, the terminal may detect a communication interference status of the terminal, and periodically report the status. In this case, the first satellite may determine the communication interference status of the first satellite based on the communication interference status of the terminal that is reported by the terminal. The first satellite may update the frequency reuse scheme used by the first satellite when determining that communication interference is severe. If the communication interference is not severe, the frequency reuse scheme may be not updated.

The first satellite may also update, based on the ephemeris information, the frequency reuse scheme used by the first satellite. For example, the first satellite updates the frequency reuse scheme used by the first satellite, when the first satellite determines, based on the ephemeris information, that the first satellite reaches a high-latitude region (for example, a 60° latitude and higher latitudes).

The first satellite may update the frequency reuse scheme used by the first satellite when determining that the following two conditions are met: communication interference is severe, and the first satellite reaches a high-latitude region.

When the first satellite performs communication by using an N-color frequency reuse scheme, a basic unit of the frequency reuse scheme of the first satellite that is sent by the first satellite to the second satellite may include the central point locations and the frequency information of the at least N−1 beams. Generally, the second satellite needs to know only the central point locations and the frequency information of the N−1 beams, to deduce a central point location and frequency information of an $N^{th}$ beam and further deduce a central point location and frequency information of each beam of the first satellite.

Figure 5A:
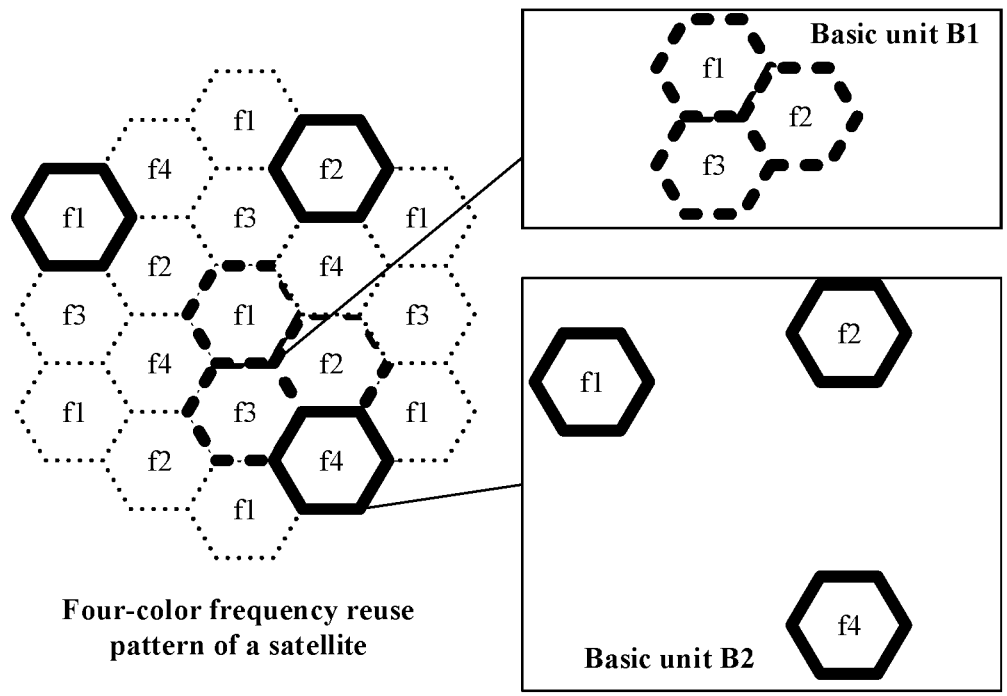
FIG. 5a is a schematic diagram of a basic unit in a frequency reuse scheme according to an embodiment of this application.

In a specific embodiment, the basic unit information sent by the first satellite to the second satellite may include the central point locations and the frequency information of the N−1 beams. Herein, the N−1 pieces of frequency information are different, and the N−1 central point locations are different. As shown in FIG. 5a, the first satellite performs communication by using a four-color frequency reuse scheme, and frequencies of a plurality of beams of the first satellite are respectively f1, f2, f3, and f4. The basic unit information sent by the first satellite to the second satellite may be central point locations and frequency information f1, f2, and f3 of beams in a basic unit B1; or may be central point locations and frequency information f1, f2, and f4 of beams in a basic unit B2.

Figure 5B:
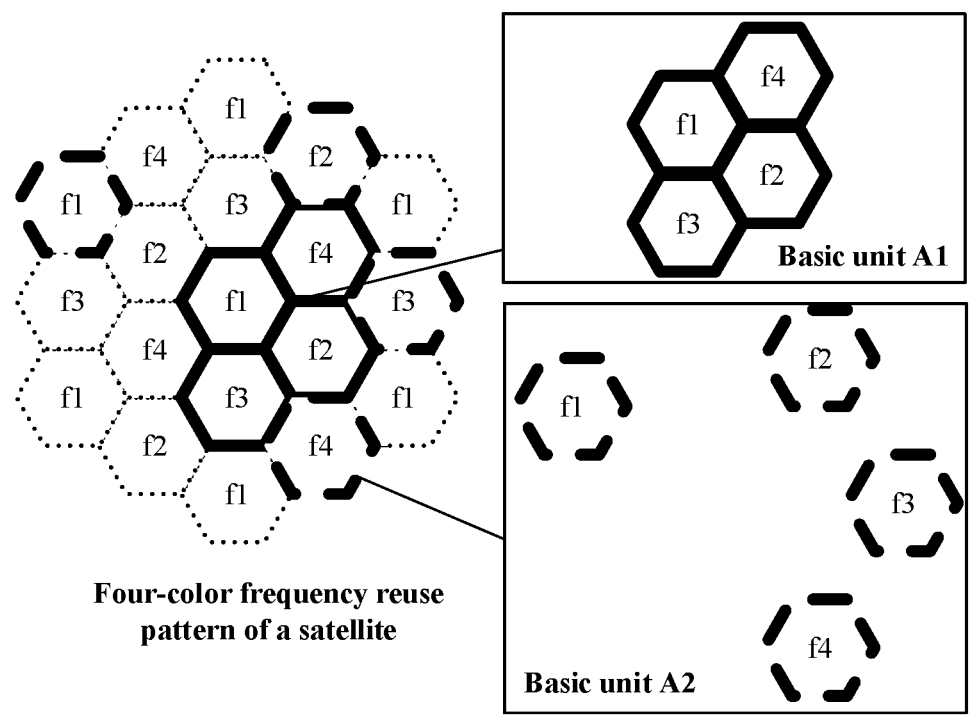
FIG. 5b is a schematic diagram of a basic unit in a frequency reuse scheme according to an embodiment of this application.

In a specific embodiment, the basic unit information sent by the first satellite to the second satellite may include the central point locations and the frequency information of the N beams. Herein, the N pieces of frequency information are different, and the N central point locations are different. As shown in FIG. 5b, the first satellite performs communication by using a four-color frequency reuse scheme, and frequencies of a plurality of beams of the satellite are respectively f1, f2, f3, and f4. The basic unit information sent by the first satellite to the second satellite may be central point locations and frequency information f1, f2, f3, and f4 of beams in a basic unit A1; or may be central point locations and frequency information f1, f2, f3, and f4 of beams in a basic unit A2.

When the first satellite performs communication by using an N-color frequency reuse scheme, the first satellite may send only the frequency information and the central point locations of the N or N−1 beams to the second satellite, and the second satellite may deduce the frequency reuse scheme of the first satellite, so that the second satellite dynamically updates the frequency reuse scheme of the second satellite. Inter-satellite signaling overheads may be reduced with no need to transmit the frequency information and the central point locations of all the beams of the first satellite.

To support transmission of the basic unit information, a new message format is defined in this application. For example, the information that is about the frequency reuse scheme and that is sent by the first satellite to the second satellite may include a first information element used to carry the frequency information of the at least N−1 beams and a second information element used to carry the central point locations of the at least N−1 beams.

A new message format is designed, to implement transmission of the basic unit information of the frequency reuse scheme, thereby avoiding inter-beam interference.

As shown in Table 1, the following example is used for description: The basic unit information sent by the first satellite to the second satellite includes the central point locations and the frequency information of the N−1 beams.

TABLE 1

| Information element name (IE/Group Name) | Presence (Presence) | Range (Range) | Information element type and reference value (IE type and reference) | Semantics description (Semantics description) | Criticality (Criticality) | Assigned criticality (Assigned criticality) |
|---|---|---|---|---|---|---|
| Message type (Message type) | Exist | | 9.2.13 | | Yes (Yes) | No (Reject) |
| Beam location (Pattern location) | Exist | 1:N | Enumerated value (Enumerated) (loc1, loc2, . . . , locN) | Location information (Location information) | — | |
| Beam frequency (Pattern frequency) | Exist | 1:N | Enumerated (f1, f2, . . . , fN) | Frequency information (Frequency information) | — | |

As shown in Table 1, a third row indicates beam location information. For example, beams 1 to N correspond to locations loc1, loc2, . . . locN. A fourth row indicates beam frequency information. For example, beams 1 to N correspond to frequencies 1, f2, . . . fN. Table 1 further includes other information, for example, information in a first row and a second row. The information also exists in an existing message, and is not further explained.

As shown in Table 2, the following example is used for description: The basic unit information sent by the first satellite to the second satellite includes the central point locations and the frequency information of the N−1 beams.

TABLE 2

| Name of an information element (IE/Group name) | Presence (Presence) | Range (Range) | Information element type and reference value (IE type and reference) | Semantics description (Semantics description) | Criticality (Criticality) | Assigned criticality (Assigned criticality) |
|---|---|---|---|---|---|---|
| Message type (Message type) | Exist | | 9.2.13 | | Yes (Yes) | No (Reject) |
| Beam location (Pattern location) | Exist | 1:N−1 | Enumerated value (Enumerated) (loc1, loc2, . . . , locN−1) | Location information (Location information) | — | |
| Beam frequency (Pattern frequency) | Exist | 1:N−1 | Enumerated (f1, f2, . . . , fN−1) | Frequency information (Frequency information) | — | |

As shown in Table 2, a third row indicates beam location information. For example, beams 1 to N−1 correspond to locations loc1, loc2, . . . locN−1. A fourth row indicates beam frequency information. For example, beams 1 to N−1 correspond to frequencies 1, f2, . . . fN−1. Table 2 further includes other information, for example, information in a first row and a second row. The information also exists in an existing message, and is not further explained.

In a possible implementation, the first satellite and the second satellite are in the same satellite cluster, and the first satellite is a cluster head satellite.

A plurality of satellites at adjacent locations together form the satellite cluster. The first satellite is the cluster head satellite in the satellite cluster, and the second satellite is a cluster member satellite in the satellite cluster. The cluster head satellite may send the basic unit information of the frequency reuse scheme to any cluster member satellite, to better avoid inter-beam interference.

Figure 6:
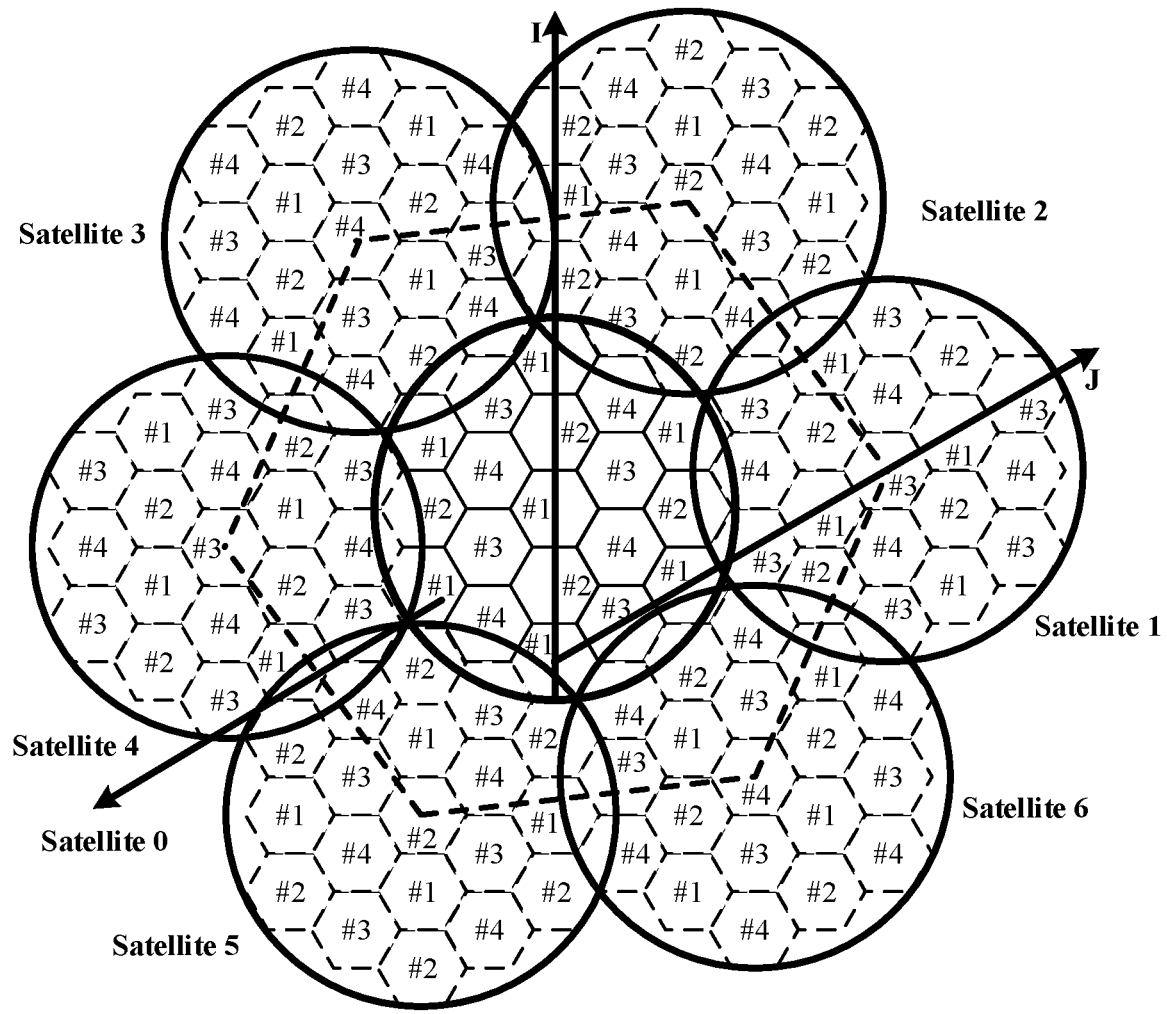
FIG. 6 is a schematic diagram of a satellite cluster according to an embodiment of this application.

As shown in FIG. 6, a satellite 0 to a satellite 6 form a satellite cluster. The satellite 0 is a cluster head satellite, and the satellite 1 to the satellite 6 are cluster member satellites. The cluster head satellite 0 may transmit, to an adjacent satellite (for example, the satellite 1 to the satellite 6) by using a frequency pattern status message, central point locations and frequency information of N or N−1 beams corresponding to a frequency reuse scheme of the cluster head satellite 0. The adjacent satellite optimizes a frequency reuse scheme of the adjacent satellite based on the central point locations and the frequency information of the beams of the cluster head satellite 0, to reduce inter-beam interference.

A core network device (such as an AMF) may divide the satellite cluster based on locations of satellite nodes, and designate the cluster head satellite. Generally, a satellite over a low-latitude region should be selected as the cluster head satellite.

As shown in FIG. 6, the same frequency can be reused along an IJ direction (IJ may be a 0°, 60°, 120°, 180°, 240°, or 300° direction) when a distance between two beam points is $N*M*ABS$. Herein, N is a frequency reuse factor of the frequency reuse scheme of the satellite 0, M is any positive integer, and ABS is a distance between central point locations of adjacent beams. When a distance between a beam and an outer intra-frequency beam of the satellite 0 is less than a specified threshold (for example, ABS), an adjacent satellite may close a current beam.

The foregoing embodiment describes the following process: The first satellite notifies the second satellite of the basic unit information of the frequency reuse scheme (before being updated or after being updated) of the first satellite, and the second satellite updates the frequency reuse scheme of the second satellite based on the basic unit information of the frequency reuse scheme of the first satellite.

In another specific embodiment, the second satellite may also notify the first satellite of the information about the frequency reuse scheme of the second satellite, and the first satellite updates the frequency reuse scheme of the second satellite and then feeds back the updated frequency reuse scheme to the second satellite.

Figure 7:
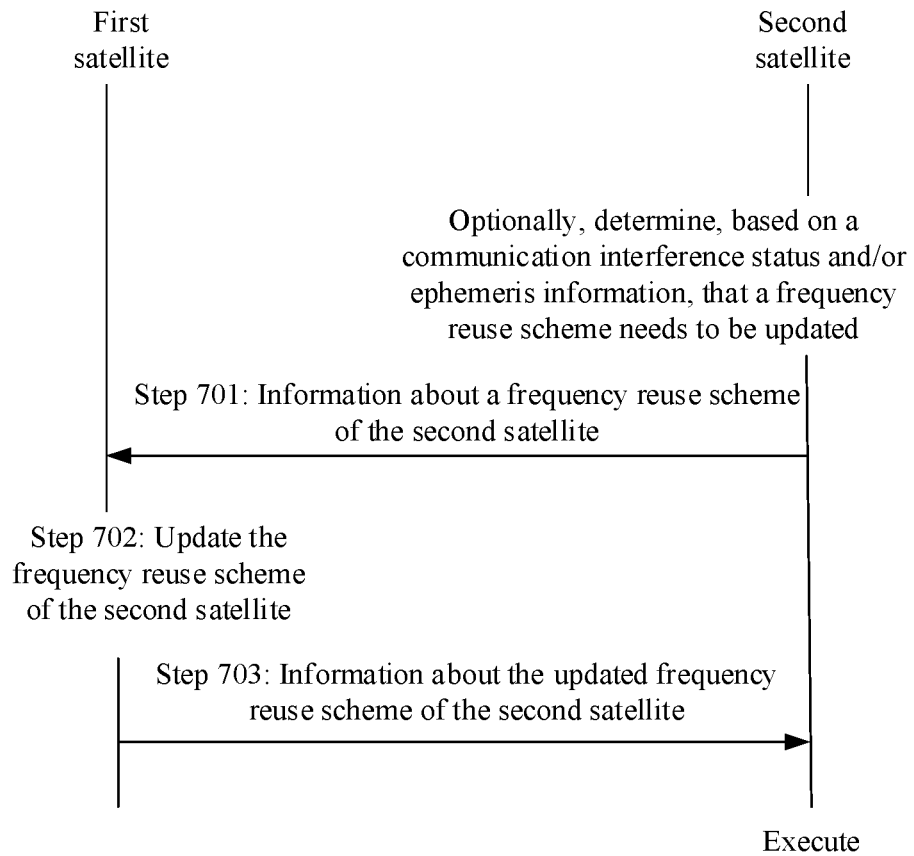
FIG. 7 is a flowchart of a dynamic frequency reuse scheme according to an embodiment of this application.

As shown in FIG. 7, a communication method is provided. A procedure about a dynamic frequency reuse scheme of a satellite is described in detail. A first satellite in FIG. 7 may be the satellite 1 in FIG. 3, and a second satellite in FIG. 7 may be the satellite 2 in FIG. 3. In a possible implementation, the first satellite and the second satellite in FIG. 7 may be relatively close to each other but have no overlapping coverage region.

Step 701: The second satellite sends a second message to the first satellite. The second message includes information about a frequency reuse scheme of the second satellite.

The second satellite may determine, based on a communication interference status of the second satellite and/or ephemeris information of the second satellite, whether to update the frequency reuse scheme used by the second satellite. If the frequency reuse scheme used by the second satellite needs to be updated, the second satellite notifies the first satellite of the information about the frequency reuse scheme of the second satellite, and the first satellite updates the frequency reuse scheme of the second satellite.

For example, the information about the frequency reuse scheme of the second satellite includes basic unit information of the frequency reuse scheme of the second satellite. For a description of the basic unit information, refer to the description part of FIG. 3. The description is not repeated.

Step 702: The first satellite updates the frequency reuse scheme of the second satellite based on a frequency reuse scheme of the first satellite.

For example, the first satellite may first deduce the frequency reuse scheme of the second satellite based on the basic unit information of the frequency reuse scheme of the second satellite, to obtain the updated frequency reuse scheme of the second satellite.

Step 703: The first satellite sends a third message to the second satellite. The third message includes information about the updated frequency reuse scheme of the second satellite.

For example, the information about the updated frequency reuse scheme of the second satellite includes the basic unit information of the updated frequency reuse scheme of the second satellite.

For content of the basic unit information of the updated frequency reuse scheme of the second satellite, refer to the basic unit information in the foregoing embodiment for design.

The second satellite may send the basic unit information of the second satellite to the first satellite. The first satellite determines, with reference to the frequency reuse scheme of the first satellite, the frequency reuse scheme that should be updated for the second satellite, and then the first satellite sends the updated frequency reuse scheme to the second satellite. The second satellite directly executes the updated frequency reuse scheme, to avoid inter-beam interference between the first satellite and the second satellite.

Figure 8:
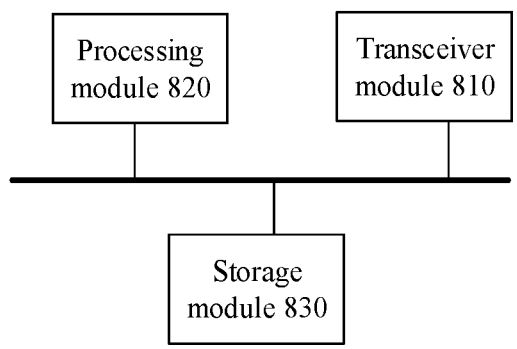
FIG. 8 shows a communication apparatus according to an embodiment of this application.

Based on the same technical concept as the foregoing communication method, as shown in FIG. 8, a communication apparatus 800 is provided. The communication apparatus 800 can perform the steps performed by the first satellite in the method in FIG. 4 or FIG. 7. To avoid repetition, details are not described herein again. The communication apparatus 800 may be the first satellite, or may be a chip applied to the first satellite. The communication apparatus 800 includes a transceiver module 810; and optionally, the communication apparatus 800 further includes a processing module 820 and a storage module 830. The processing module 820 may be separately connected to the storage module 830 and the transceiver module 810. The storage module 830 may also be connected to the transceiver module 810.

The storage module 830 is configured to store a computer program.

For example, the transceiver module 810 is configured to send a first message to a second satellite. The first message includes information about a frequency reuse scheme of the apparatus. The information about the frequency reuse scheme includes basic unit information. The basic unit information includes central point locations and frequency information of at least N−1 beams. Herein, N is a frequency reuse factor of the first satellite. At least N−1 different pieces of frequency information exist in the frequency information that is of the at least N−1 beams and that is included in the basic unit information. In addition, N is a positive integer greater than or equal to 3.

The processing module 820 may be configured to update, based on a communication interference status and/or ephemeris information of the first satellite, a frequency reuse scheme used by the first satellite.

Figure 9:
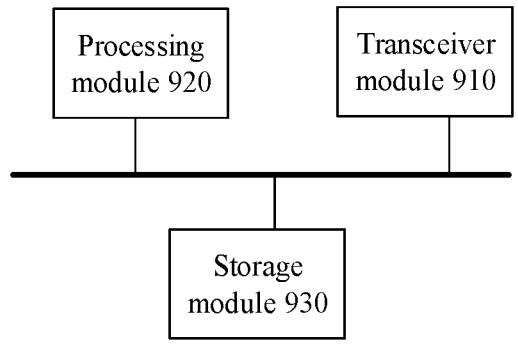
FIG. 9 shows a communication apparatus according to an embodiment of this application.

Based on the same technical concept as the foregoing communication method, as shown in FIG. 9, a communication apparatus 900 is provided. The communication apparatus 900 can perform the steps performed by the second satellite in the method in FIG. 4 or FIG. 7. To avoid repetition, details are not described herein again. The communication apparatus 900 may be the second satellite, or may be a chip applied to the second satellite. The communication apparatus 900 includes a transceiver module 910; and optionally, the communication apparatus 900 further includes a processing module 920 and a storage module 930. The processing module 920 may be separately connected to the storage module 930 and the transceiver module 910. The storage module 930 may also be connected to the transceiver module 910.

The storage module 930 is configured to store a computer program.

For example, the transceiver module 910 is configured to receive a first message sent by a first satellite. The first message includes information about a frequency reuse scheme of the first satellite. The information about the frequency reuse scheme includes basic unit information. The basic unit information includes a central point location and frequency information of each of at least N−1 beams. Herein, N is a frequency reuse factor of the first satellite. At least N−1 different pieces of frequency information exist in the frequency information that is of the at least N−1 beams and that is included in the basic unit information. In addition, N is a positive integer greater than or equal to 3.

The processing module 920 is configured to update a frequency reuse scheme of the second satellite based on the basic unit information of the frequency reuse scheme.

Figure 10:
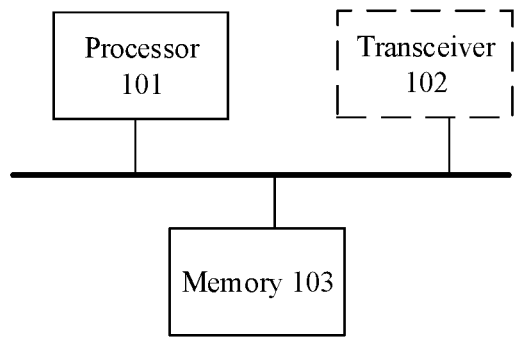
FIG. 10 shows a communication apparatus according to an embodiment of this application.

FIG. 10 is a schematic block diagram of a communication apparatus 100 according to an embodiment of this application. It should be understood that the communication apparatus 100 can perform the steps performed by the first satellite in the method in FIG. 4 or FIG. 7. To avoid repetition, details are not described herein again. The communication apparatus 100 includes a processor 101 and a memory 103. The processor 101 is electrically coupled to the memory 103.

The memory 103 is configured to store computer program instructions.

The processor 101 is configured to execute some or all of the computer program instructions in the memory. When the some or all of the computer program instructions are executed, the apparatus sends a first message to a second satellite. The first message includes information about a frequency reuse scheme of the apparatus. The information about the frequency reuse scheme includes basic unit information. The basic unit information includes central point locations and frequency information of at least N−1 beams. Herein, N is a frequency reuse factor of the first satellite. At least N−1 different pieces of frequency information exist in the frequency information that is of the at least N−1 beams and that is included in the basic unit information. In addition, N is a positive integer greater than or equal to 3. Further, the apparatus updates, based on a communication interference status and/or ephemeris information of the first satellite, the frequency reuse scheme used by the apparatus.

Optionally, the communication apparatus 100 further includes: a transceiver 102, configured to communicate with another device, for example, send the first message to the second satellite.

It should be understood that the communication apparatus 100 shown in FIG. 10 may be a chip or a circuit, for example, a chip or a circuit disposed in the first satellite. Alternatively, the transceiver 102 may be a communication interface. The transceiver includes a receiver and a transmitter. Further, the communication apparatus 100 may further include a bus system.

The processor 101, the memory 103, and the transceiver 102 are connected by using the bus system. The processor 101 is configured to execute the instructions stored in the memory 103, to control the transceiver to receive a signal and send a signal, and to complete the steps of the first satellite in the communication method in this application. The memory 103 may be integrated into the processor 101, or may be disposed independent of the processor 101.

In an implementation, it may be considered that functions of the transceiver 102 are implemented by using a transceiver circuit or a dedicated transceiver chip. It may be considered that the processor 101 is implemented by using a dedicated processing chip, a processing circuit, a processor, or a general-purpose chip.

Figure 11:
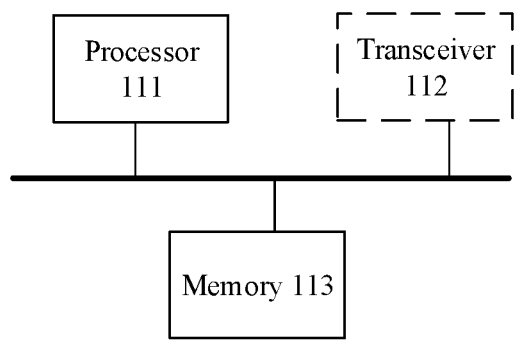
FIG. 11 shows a communication apparatus according to an embodiment of this application.

FIG. 11 is a schematic block diagram of a communication apparatus 110 according to an embodiment of this application. It should be understood that the communication apparatus 110 can perform the steps performed by the second satellite in the method in FIG. 4 or FIG. 7. To avoid repetition, details are not described herein again. The communication apparatus 110 includes a processor 111 and a memory 113. The processor 111 is electrically coupled to the memory 113.

The memory 113 is configured to store computer program instructions.

The processor 111 is configured to execute some or all of the computer program instructions in the memory. When the some or all of the computer program instructions are executed, the apparatus receives a first message sent by a first satellite. The first message includes information about a frequency reuse scheme of the first satellite. The information about the frequency reuse scheme includes basic unit information. The basic unit information includes a central point location and frequency information of each of at least N−1 beams. Herein, N is a frequency reuse factor of the first satellite. At least N−1 different pieces of frequency information exist in the at least N−1 pieces of frequency information included in the basic unit information. In addition, N is a positive integer greater than or equal to 3. Further, the apparatus updates a frequency reuse scheme of the second satellite based on the basic unit information of the frequency reuse scheme.

Optionally, the communication apparatus 110 further includes: a transceiver 112, configured to communicate with another device, for example, receive the first message sent by the first satellite.

It should be understood that the communication apparatus 110 shown in FIG. 11 may be a chip or a circuit, for example, a chip or a circuit disposed in the second satellite. Alternatively, the transceiver 112 may be a communication interface. The transceiver includes a receiver and a transmitter. Further, the communication apparatus 110 may further include a bus system.

The processor 111, the memory 113, and the transceiver 112 are connected by using the bus system. The processor 111 is configured to execute the instructions stored in the memory 113, to control the transceiver to receive a signal and send a signal, and to complete the steps of the second satellite in the communication method in this application. The memory 113 may be integrated into the processor 111, or may be disposed independent of the processor 111.

In an implementation, it may be considered that functions of the transceiver 112 are implemented by using a transceiver circuit or a dedicated transceiver chip. It may be considered that the processor 111 may be implemented by using a dedicated processing chip, a processing circuit, a processor, or a general-purpose chip.

The processor may be a central processing unit (central processing unit, CPU), a network processor (network processor, NP), or a combination of a CPU and an NP.

The processor may further include a hardware chip or another general-purpose processor. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), general array logic (generic array logic, GAL) and another programmable logic device, a discrete gate or transistor logic device, a discrete hardware component, or any combination thereof. The general-purpose processor may be a microprocessor, or the processor may be any conventional processor or the like.

It may be further understood that the memory mentioned in the embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative descriptions, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory described in this application aims to include but is not limited to these memories and any memory of another proper type.

An embodiment of this application provides a computer storage medium. The computer storage medium stores a computer program. The computer program includes instructions used to perform the foregoing communication method.

An embodiment of this application provides a computer program product including instructions. When the computer program product is run on a computer, the computer is enabled to perform the communication method provided above.

Persons of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. Persons skilled in the art may use different methods to implement the described functions of each particular application, but it should not be considered that the implementation goes beyond the scope of this application.

It may be clearly understood by persons skilled in the art that, for convenient and brief description, reference may be made to a corresponding process in the foregoing method embodiments for a detailed working process of the foregoing system, apparatus, and unit. Details are not described herein again.

In the embodiments provided in this application, it should be understood that the described apparatus embodiments are merely examples. For example, division into units is merely logical function division and may be other division in actual implementation. For example, a plurality of units or components may be combined or integrated into another system, or some features may be ignored or not performed. In addition, the displayed or discussed mutual communication connections may be implemented through some interfaces. The indirect couplings or communication connections between the apparatuses or units may be implemented in electronic, mechanical, or other forms.

In addition, units in the apparatus embodiments of this application may be integrated into one processing unit, or each of the units may exist alone physically, or two or more units may be integrated into one unit.

It may be understood that, the processor in the embodiments of this application may be a central processing unit (central processing unit, CPU), or may be another general-purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The general-purpose processor may be a microprocessor or any conventional processor.

All or some of the methods in the embodiments of this application may be implemented by software, hardware, firmware, or any combination thereof. When software is used to implement the embodiments, the embodiments may be implemented completely or partially in a form of a computer program product. The computer program product includes one or more computer programs or instructions. When the computer programs or the instructions are loaded and executed on a computer, all or some of procedures or functions in the embodiments of this application are performed. The computer may be a general-purpose computer, a dedicated computer, a computer network, or another programmable apparatus. The computer programs or instructions may be stored in a computer-readable storage medium, or may be transmitted through the computer-readable storage medium. The computer-readable storage medium may be any usable medium accessible by a computer, or a data storage device such as a server integrating one or more usable media. The usable medium may be a magnetic medium such as a floppy disk, a hard disk, or a magnetic tape, or may be an optical medium such as a CD-ROM or a DVD, or may be a semiconductor medium such as a solid-state drive (solid-state disk, SSD), a random access memory (random access memory, RAM), a read-only memory (read-only memory, ROM), or a register.

Persons skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may alternatively be loaded onto the computer or the another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

Although some preferred embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Obviously, persons skilled in the art can make various modifications and variations to the embodiments of this application without departing from the spirit and scope of the embodiments of this application. This application is intended to cover these modifications and variations of this application provided that they fall within the scope of protection defined by the following claims and their equivalent technologies.

What is claimed is:

1. A communication method, wherein the communication method comprises:
   sending, by a first satellite, a first message to a second satellite, wherein:
      the first message comprises information about a frequency reuse scheme,
      the information about the frequency reuse scheme comprises basic unit information,
      the basic unit information comprises central point locations and frequency information of at least N−1 beams,
      N is a frequency reuse factor of the first satellite,
      at least N−1 different pieces of frequency information exist in the frequency information that is of the at least N−1 beams and that is comprised in the basic unit information, and
      N is a positive integer greater than or equal to 3.

2. The communication method according to claim 1, wherein the information about the frequency reuse scheme comprises a first information element used to carry the frequency information of the at least N−1 beams and a second information element used to carry the central point locations of the at least N−1 beams.

3. The communication method according to claim 1, wherein before the sending, by a first satellite, a first message to a second satellite, the communication method further comprises:
   updating, by the first satellite based on at least one of a communication interference status or ephemeris information of the first satellite, the frequency reuse scheme used by the first satellite.

4. The communication method according to claim 1, wherein the first satellite and the second satellite are in a same satellite cluster, and the first satellite is a cluster head satellite, and wherein:
   the cluster head satellite does not update the frequency reuse scheme of the cluster head satellite; or
   when updating the frequency reuse scheme of the cluster head satellite, the cluster head satellite does not refer to a frequency reuse scheme of a cluster member satellite, wherein the second satellite is the cluster member satellite.

5. A communication method, wherein the communication method comprises:
   receiving, by a second satellite, a first message sent by a first satellite, wherein:
      the first message comprises information about a frequency reuse scheme,
      the information about the frequency reuse scheme comprises basic unit information,
      the basic unit information comprises central point locations and frequency information of at least N−1 beams,
      N is a frequency reuse factor of the first satellite,
      at least N−1 different pieces of frequency information exist in the frequency information that is of the at least N−1 beams and that is comprised in the basic unit information, and
      N is a positive integer greater than or equal to 3; and
   updating, by the second satellite, a frequency reuse scheme of the second satellite based on the basic unit information of the frequency reuse scheme.

6. The communication method according to claim 5, wherein the information about the frequency reuse scheme comprises a first information element used to carry the frequency information of the at least N−1 beams and a second information element used to carry the central point locations of the at least N−1 beams.

7. The communication method according to claim 5, wherein the first satellite and the second satellite are in a same satellite cluster, and the first satellite is a cluster head satellite, and wherein:
   the cluster head satellite does not update the frequency reuse scheme of the cluster head satellite; or
   when updating the frequency reuse scheme of the cluster head satellite, the cluster head satellite does not refer to a frequency reuse scheme of a cluster member satellite, wherein the second satellite is the cluster member satellite.

8. A communication apparatus, wherein the communication apparatus comprises:
   at least one processor; and
   one or more memories coupled to the at least one processor and storing program instructions for execution by the at least one processor to:
      send a first message to a second satellite, wherein:
         the first message comprises information about a frequency reuse scheme of the communication apparatus,
         the information about the frequency reuse scheme comprises basic unit information,
         the basic unit information comprises central point locations and frequency information of at least N−1 beams, N is a frequency reuse factor of a first satellite,
         at least N−1 different pieces of frequency information exist in the frequency information that is of the at least N−1 beams and that is comprised in the basic unit information, and
         N is a positive integer greater than or equal to 3.

9. The communication apparatus according to claim 8, wherein the information about the frequency reuse scheme comprises a first information element used to carry the frequency information of the at least N−1 beams of the apparatus and a second information element used to carry the central point locations of the at least N−1 beams of the apparatus.

10. The communication apparatus according to claim 8, wherein the one or more memories store the program instructions for execution by the at least one processor to:
  update, based on at least one of a communication interference status or ephemeris information of the first satellite, the frequency reuse scheme used by the first satellite.

11. The communication apparatus according to claim 8, wherein the communication apparatus and the second satellite are in a same satellite cluster, and the communication apparatus is a cluster head satellite, and wherein:
  the cluster head satellite does not update the frequency reuse scheme of the cluster head satellite; or
  when updating the frequency reuse scheme of the cluster head satellite, the cluster head satellite does not refer to a frequency reuse scheme of a cluster member satellite, wherein the second satellite is the cluster member satellite.

\* \* \* \* \*